United States Patent
Hyde, II et al.

(10) Patent No.: US 10,082,979 B2
(45) Date of Patent: Sep. 25, 2018

(54) INPUT/OUTPUT OPERATION MANAGEMENT IN A DEVICE MIRROR RELATIONSHIP

(71) Applicant: International Business Machines Corporation, Armonk, NY (US)

(72) Inventors: Joseph S. Hyde, II, Tucson, AZ (US); Sonny E. Williams, Tucson, AZ (US); Yan Xu, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 13/960,503

(22) Filed: Aug. 6, 2013

(65) Prior Publication Data
US 2015/0046668 A1    Feb. 12, 2015

(51) Int. Cl.
*G06F 12/00*    (2006.01)
*G06F 3/06*    (2006.01)

(52) U.S. Cl.
CPC .............. *G06F 3/065* (2013.01); *G06F 3/061* (2013.01); *G06F 3/0689* (2013.01); *G06F 12/00* (2013.01)

(58) Field of Classification Search
CPC ...................................................... G06F 12/00
USPC ........................................................ 711/162
See application file for complete search history.

(56) References Cited

U.S. PATENT DOCUMENTS

| | | | |
|---|---|---|---|
| 5,734,818 A * | 3/1998 | Kern et al. ...................... 714/20 |
| 6,044,367 A * | 3/2000 | Wolff ............................. 707/704 |
| 6,173,377 B1 * | 1/2001 | Yanai et al. ................... 711/162 |
| 7,076,690 B1 | 7/2006 | Todd et al. |
| 7,085,956 B2 | 8/2006 | Petersen et al. |
| 7,366,852 B2 | 4/2008 | Hung |
| 7,761,610 B2 | 7/2010 | Betz et al. |
| 7,945,816 B1 * | 5/2011 | Gardner .......................... 714/43 |
| 8,307,129 B2 | 11/2012 | Betz et al. |
| 2008/0104259 A1 * | 5/2008 | LeFevre .............. H04L 67/1097 709/228 |
| 2010/0023647 A1 | 1/2010 | Betz et al. |

(Continued)

OTHER PUBLICATIONS

M. Chapple, "The ACID Model", About.com, [online] [retrieved Jun. 4, 2013] http://databases.about.com/od/specificproducts/a/acid.htm, pp. 1.

(Continued)

*Primary Examiner* — Gautam Sain
(74) *Attorney, Agent, or Firm* — William K. Konrad; Konrad Raynes Davda & Victor LLP

(57) ABSTRACT

In a network computing environment, in which data stored at a primary storage system, is mirrored from the primary storage system to a secondary storage system, a selection may be made to direct an input/output operation such as a read operation, for example, to the secondary storage system instead of the primary storage system in order to improve operations. For example, a read operation may be directed to the secondary storage to improve the read operation response time. In other aspects, a read or other input/output operation may be directed to the secondary storage to improve utilization of the resources of the secondary storage system. Other aspects are described.

24 Claims, 6 Drawing Sheets

(56) References Cited

U.S. PATENT DOCUMENTS

2011/0093862 A1* 4/2011 Doatmas ............... G06F 3/0617
                                                        718/105
2012/0192006 A1* 7/2012 Qi et al. ....................... 714/6.22
2012/0221521 A1* 8/2012 Chiu et al. .................... 707/622

OTHER PUBLICATIONS

R. Weller, et al., "Introduction to the New Mainframe: Security", IBM Corp. Redbooks, Document No. SG24-6776-00, Mar. 2007, pp. 550.

"Atomicity (database systems)", Wikipedia, [online] [retireved Jun. 11, 2013], http://en.wikipedia.org/wiki/atomicity (database systems), pp. 3.

"Isolation (database systems)", Wikipedia, [online] [retireved Jun. 11, 2013], http://wikipedia.org/wiki/isolation (database systems), pp. 8.

"Method of Defining Fixed Block Architecture (FBA) Devices within Subchannel Sets other than Subchannel Set Zero", IBM, IP.com Prior Art Database Disclosure No. IPCOM000191249D, Dec. 23, 2009, pp. 2.

* cited by examiner

INPUT/OUTPUT OPERATION MANAGEMENT IN A DEVICE MIRROR RELATIONSHIP

BACKGROUND OF THE INVENTION

1. Field of the Invention

The present invention relates to a method, system, and program for redirecting input/output operations among devices in a device mirror relationship.

2. Description of the Related Art

Data backup systems can provide continuous availability of production data in the event of a sudden catastrophic failure at a single point in time or access to data is lost, temporarily from a primary device due to recovery processes, error recovery procedures, temporary hardware errors, etc. over a period of time. In one such system, production data is mirrored from a local site to a remote site which may be separated geographically by several or many miles from the local site. Such dual, mirror or shadow copies are typically made in a secondary storage device at the remote site, as the application system is writing new data to a primary storage device usually located at the local site. Different copy technologies may be used for maintaining remote copies of data at a secondary site, such as International Business Machine Corporation's ("IBM") Metro Mirror, Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical synchronous copy of the data maintained in the primary volume. The primary and secondary volumes are identified by a copy relationship. Primary and secondary storage controllers may be used to control access to the primary and secondary storage devices. The storage devices may be connected in a storage area network (SAN) which includes one or more hosts writing data to and reading data from the storage devices accessed through one or more storage controllers. The data is mirrored from the primary storage devices at the local site, through the SAN, to the secondary storage devices at the remote site.

Geographically Dispersed Parallel Sysplex (GDPS) is an example of an application that customers may use to manage planned and unplanned outages. The GDPS application can detect failures at the primary storage system which may be at a local site, for example. Such failures may include a problem writing or accessing primary storage volumes at the local site. When the GDPS recovery application detects that a failure has occurred, it can invoke a swapping function referred to as the "HyperSwap" function. This function may be used to swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again.

In connection with the swapping function, a failover function may be invoked. In the GDPS recovery application, the failover function can in some instances, obviate performing a full copy when re-establishing data replication in the opposite direction, that is, from the remote site back to the local site. More specifically, the failover processing resets or reconfigures the remote storage devices (which were originally configured as the secondary storage devices) to be the primary storage devices which are placed in a "suspended" status pending resumption of the mirroring operation but in the opposite direction. In the meantime, the failover processing starts change recording for any subsequent data updates made by the host to the remote site.

Once the local site is operational, failback processing may be invoked to reset the storage devices at the local site (which were originally configured as the primary storage devices) to be the secondary storage devices. Mirroring may then be resumed (but in the opposite direction, that is remote to local rather than local to remote) to resynchronize the secondary storage devices (originally the primary storage devices) at the local site to the data updates being stored at the primary storage devices (originally the secondary storage devices) at the remote site.

In a storage system such as a SAN, certain conditions can unduly prolong input/output (I/O) operations which can result in unsatisfactory response times. Thus, completion of I/O operations may be delayed several or tens of seconds, for example. Certain client industry segments, especially the financial industry, frequently require relatively stringent I/O response times which are often much less than one second. To address these needs, efforts have been made to reduce conditions which can cause long I/O response times within the storage system and the I/O applications executing on the hosts. For example, attempts have been made to reduce the frequency or duration of error recovery processes which could otherwise prolong I/O response times. However, reducing or eliminating all such conditions would be difficult to achieve.

SUMMARY

Provided are a method, system, and program for, in one embodiment, mirroring data stored at a primary storage system, from the primary storage system to a secondary storage system from the primary storage system, and selecting whether to direct an input/output operation such as a read operation, for example, to one of the primary storage system and the secondary storage system as a function of at least one of input/output operation response time and a comparison of utilization of the resources of the primary storage system and the secondary storage system. A read operation, for example, may then be directed to the selected one of the primary storage system and the secondary storage system to read data which has been mirrored from the primary storage system to the secondary storage system.

In another aspect, the read operation selecting may include initiating a first read operation directed to the primary storage system to read mirrored read data from the primary storage system, and determining whether a predetermined time period has expired prior to completion of the first read operation. In response to expiration of the predetermined time period prior to completion of the first read operation, the first read operation to the primary storage system may be cancelled and then restarted to read the mirrored read data from the secondary storage system instead of from the primary storage system.

Another aspect is directed to selecting to direct a read operation to the secondary storage system instead of to the primary storage system to increase utilization of resources of the secondary storage system relative to utilization of resources of the primary storage system. In still another aspect, the selecting as a function of read operation response time may include determining whether the secondary storage system is at a shorter distance to the initiator of a first read operation and selecting to direct the first read operation to the secondary storage system instead of to the primary storage system if the secondary storage system is determined to be geographically closer than the primary storage system, to the initiator of the first read operation.

Yet another aspect is directed to initiating a recovery process in the primary storage system in response to a failure in the primary storage system which increases read operation response time, wherein the selecting as a function of read operation response time includes selecting to direct a read operation to the secondary storage system instead of to the primary storage system in response to initiation of the recovery process. Still another aspect includes selecting to direct a read operation to the secondary storage system instead of to the primary storage system to decrease contention over utilization of resources of the primary storage system.

In another embodiment, the selecting includes selecting to direct a read operation to the secondary storage system instead of to the primary storage system to increase utilization of the cache of the secondary storage system relative to utilization of the cache of the primary storage system. In yet another aspect, a suspend event may be detected in which the mirroring of data from the primary storage system to a secondary storage system is suspended, and in response, a first read operation to the secondary storage system, may be cancelled and then restarted to read data from the primary storage system instead of from the secondary storage system.

In yet another embodiment, a storage device in the primary storage system has a first device number in a first subchannel set and a storage device in the secondary storage system has the same first device number in second, separate subchannel set, and wherein the directing a read operation to the selected one of the primary storage system and the secondary storage system includes directing a read operation to a storage device having the first device number in a selected subchannel set of the selected one of the primary storage system and the secondary storage system.

Other embodiments, aspects and features are described herein.

DETAILED DESCRIPTION

Figure 1:
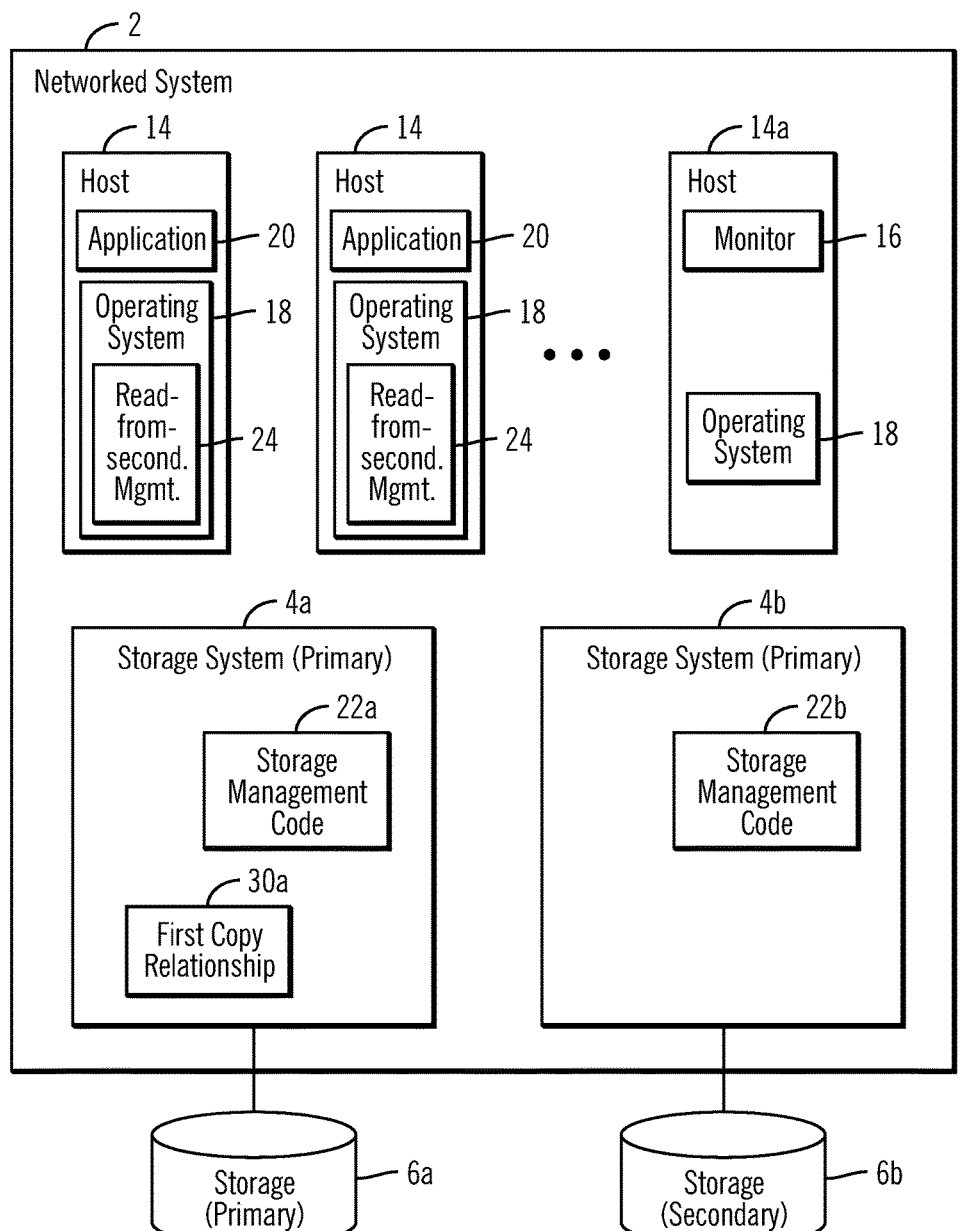
FIG. 1 illustrates an example of a network computing environment, employing I/O operation management in accordance with one embodiment of the present description.

FIG. 1 illustrates an embodiment of a network computing environment having a mirror relationship between a storage location at one site and a storage location at another site. For example, data stored at a primary storage system, may be mirrored from the primary storage system to a secondary storage system geographically remote from the primary storage system. In one aspect of the present description, a selection may be made to direct a read operation to the secondary storage system instead of to the primary storage system in order to improve operations. For example, a read operation may be directed to the secondary storage to improve the read operation response time. In other aspects, a read operation may be directed to the secondary storage to improve utilization of the resources of the secondary storage system. As described in greater detail below, it is believed that such an arrangement can improve the economics of a data center by utilizing the presence of a second storage subsystem that contains an exact mirror copy of the production data residing on the primary storage system.

Although the embodiment of FIG. 1 is described in connection with a mirror relationship, it is believed that aspects of the present description are applicable to other types of copy relationships, depending upon the particular application. Although a detailed example is described in connection with read operations, it is appreciated that aspects of the present description are applicable to other types of input/output operations such as write operations, for example, which may be directed or redirected to a secondary storage system. Additional features are discussed in the present description. It is appreciated that other features may be realized instead of or in addition to those discussed herein, depending upon the particular application.

In the illustrated embodiment, a copy relationship identifies a primary storage location and a secondary storage location in which data stored at the primary storage location is to be mirrored or otherwise copied to the secondary storage location. Thus, as used herein, a primary storage location and a secondary storage location are storage locations related by a copy relationship.

Furthermore, as used herein, the term "storage location" refers to a storage location containing one or more units of data storage such as one or more volumes, cylinders, tracks, extents, segments or any portion thereof, or other unit or units of data suitable for transfer. Thus, a primary storage location and the secondary storage location may each be a storage volume, wherein the volumes are typically at geographically different sites. However, it is appreciated that a primary storage location and a secondary storage location may each be of a size other than a volume, for example. It is appreciated that a primary storage location and a secondary storage location may be located at the same site, in some embodiments.

In the illustrated embodiment, a networked system 2 includes storage systems 4a, 4b, (also known as control units or storage controllers), and data storages 6a, 6b. The storage systems 4a, 4b, manage the copying of updates from a primary storage system to a secondary storage system. In the configuration illustrated in FIG. 1, the storage system 4a and the data storage 6a have been configured as a primary storage system and the primary storage, respectively. Similarly, the storage system 4b and its data storage 6b have been configured as a secondary storage system and a secondary storage, respectively. Hence, in the configuration depicted in FIG. 1, the storage system 4a will be referred to as a primary storage system 4a and the data storage 6a will be referred to as a primary storage 6a. Similarly, the storage system 4b will be referred to as a secondary storage system 4b and the data storage 6b will be referred to as a secondary data storage 6b. It is appreciated that the storage systems and storages may be reconfigured to change the associated primary and secondary roles within a copy relationship.

The networked system 2 further includes one or more hosts 14 writing updates to the primary storage 6a. At least one such host 14, such as the host 14a, has in this embodiment, a monitor program 16 monitoring failures in the availability of the primary storage system 4a. In some embodiments, the monitor program 16 may be operated in a device apart from the hosts. The components 4a, 4b, 6a, 6b, and 14 are connected to the networked system 2 and the networked system 2 enables communication among these components. The networked system 2 may include one or more switches to provide one or more paths of communication between the different networked system 2 elements.

The primary storage system 4a is located at a first site and the secondary storage system 4b is located at a second site which may be geographically or functionally remote from the first site. Thus, in this example, the first site may be at a local site and the second site may be at a geographically remote site separated by a short or long geographical distance from the local site. Alternatively, the local and remote sites may be relatively close such as in different buildings in the same general geographical location, in different rooms of the same building, in different machines in the same room, or in different portions or partitions of the same machine, of the networked system 2.

A typical host 14 includes an operating system 18 and an application 20 that writes updates to the primary 6a or secondary 6b storage. The host 14a which includes the monitor program 16 may omit the update writing applications 20 in some embodiments. The primary 4a and secondary 4b storage systems include storage management software 22a and 22b to manage the data mirroring operations. In one embodiment, the operating system 18 of each host 14 includes a read-from-secondary management 24 which selectively directs or redirects read operations to be read from either the primary storage system 4a or the secondary storage system 4b in accordance with the present description, as described in greater detail below. It is appreciated that in other embodiments, such read-from-secondary management 24 may be implemented in software such within an application 20, in firmware or within logic circuitry hardware or a combination thereof, depending upon the particular application.

A first copy relationship 30a, which may be maintained for the primary 4a and secondary 4b storage systems, associates primary storage locations in the primary storage 6a and corresponding secondary storage locations in the secondary storage 6b, such that updates to the primary storage 6a locations are copied to the corresponding secondary storage 6b locations. In some embodiments, the updates to the primary storage 6a locations may be copied to the corresponding secondary storage 6b locations before they are written to the primary storage 6a.

In the illustrated embodiment, the first copy relationship 30a comprises a peer-to-peer mirror relationship for a pair of storage locations in which updates to the primary storage locations of the mirror relationship 30a are mirrored to the secondary storage locations of the mirror relationship 30a. It is appreciated that other types of copy relationships may be established, depending upon the particular application.

The storage management software 22a accesses updates to the primary storage 6a to write to the corresponding storage locations in the storage 6b. In some applications, the copying and relationship functions may be performed by devices external to the storage systems 4a, 4b, such as the hosts 14, for example.

The monitor program 16 may monitor the primary storage system 4a and upon detecting a failure event, may cause a failover operation to cause updates from the host 14 to be sent to the secondary storage system 4b instead of to the primary storage system 4a. If the system fails while updates to the primary storage 6a are being applied to the storage 6b, then the updates that did not complete being mirrored to the storage 6b can be recovered and applied to the storage 6b.

The storage management code 22a, 22b is invoked to establish a copy relationship such as the first copy relationship 30a, between first and second storage locations in a first storage system and second storage system, respectively. The storage systems 4a, 4b may comprise enterprise storage servers, such as the IBM System Storage DS8000 series, for example.

The storage management code 22a, 22b managing the first copy relationship 30a may be implemented using synchronous copy operations, such as a peer-to-peer remote copy (PPRC) program. An example of a PPRC program is the IBM Geographically Dispersed Parallel Sysplex (GDPS)/PPRC copy program that enables the switching of updates to the primary storage 6a to the secondary storage 6b. The storage management code 22a, 22b, and 22c may also implement asynchronous remote copy operations. An example of an asynchronous remote copy program is the IBM GDPS/XRC program where updates to the primary 6a or secondary 6b storage are mirrored to a corresponding location in at a remote site. The described operations may be implemented with other programs such as other copy programs or other global recovery programs.

The networked system 2 may comprise a Storage Area Network (SAN), Local Area Network (LAN), Intranet, the Internet, Wide Area Network (WAN), peer-to-peer network, wireless network, arbitrated loop network, etc. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc.

Figure 2:
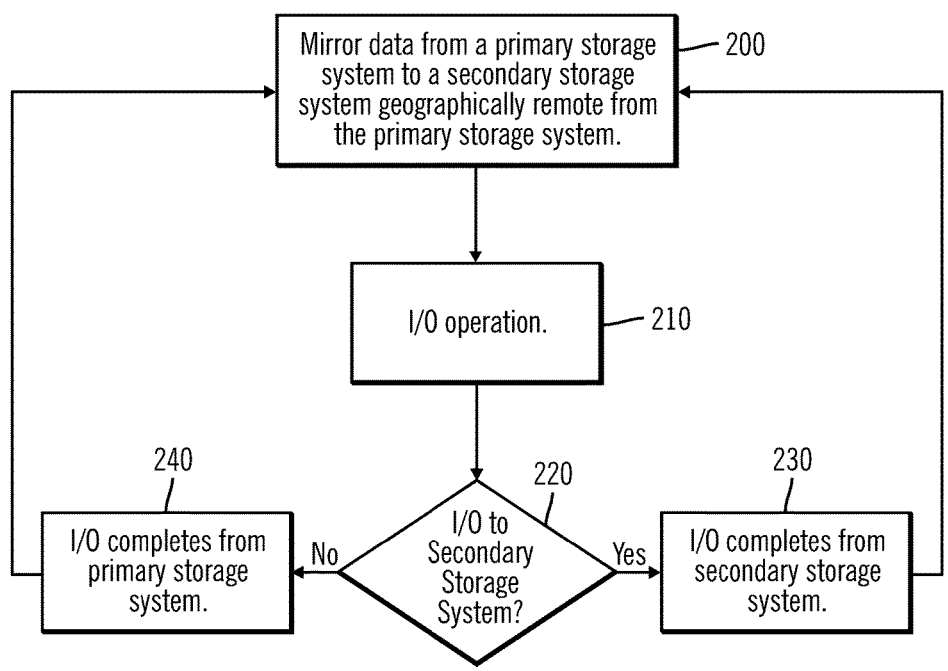
FIG. 2 illustrates an embodiment of operations to manage data read operations in a storage system having a mirrored relationship, in accordance with an aspect of the present description.

FIG. 2 illustrates one example of operations of a networked system in accordance with one embodiment of the present description. In a first operation, data stored at a primary storage system such as the system 4a, for example, is mirrored (200) from the primary storage system to a secondary storage system such as the system 4b, for example, geographically remote from the primary storage system. As a result, a consistent set of data is stored at both the primary storage system and the secondary storage system. In accordance with the present description, in association with an I/O operation (block 210) such as a read operation, for example, typically initiated by a host such as one of the hosts 14, for example, a determination (block 220) is made as to whether to direct the I/O operation to the secondary storage system to be completed (block 230) or to the primary storage system to be completed (block 240). For example, if the I/O operation is a read operation, a determination (block 220) is made whether to read the requested data from the secondary storage system (block 230) rather than from the primary storage system (block 240). In accordance with the present description, it is believed that there are a number of conditions upon which it may be beneficial to base a determination such as determination 220, as to whether to conduct one or more read operations from the secondary storage system rather than from the primary storage system.

Figure 3:
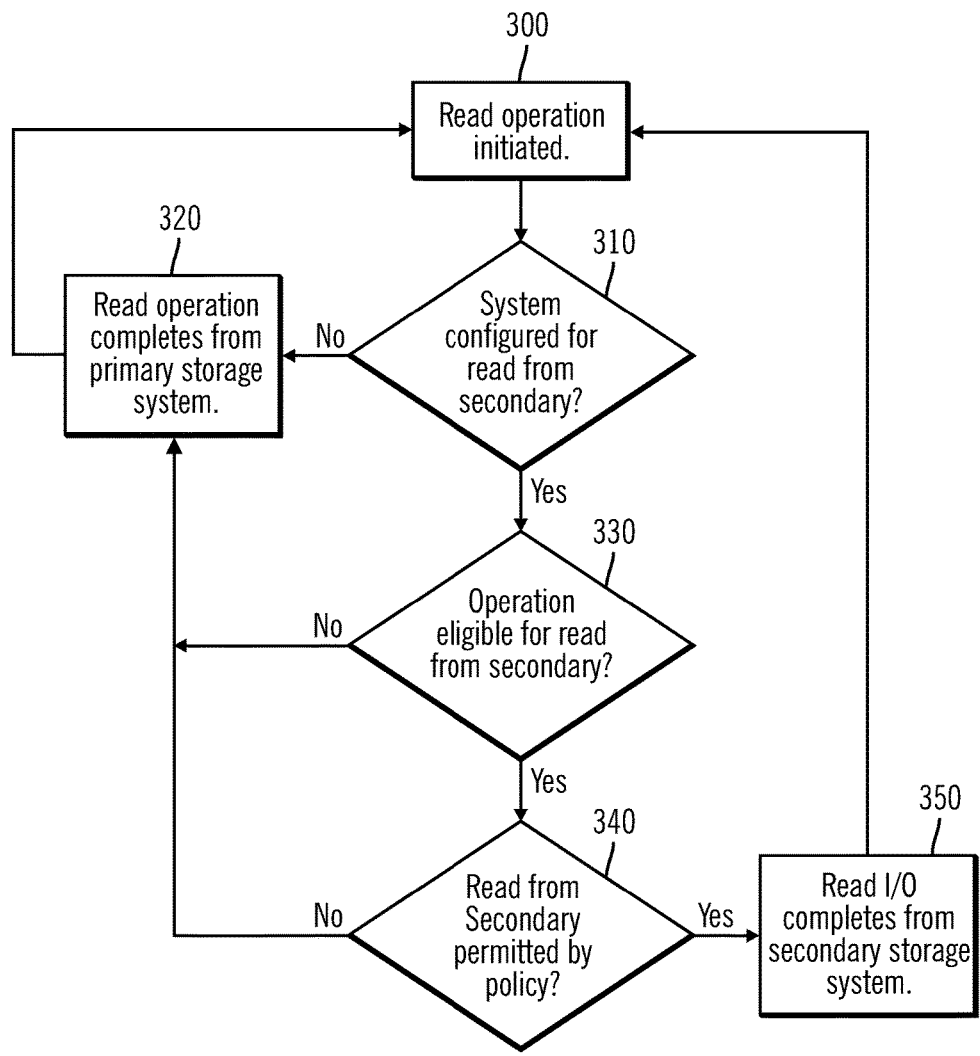
FIG. 3 illustrates another embodiment of operations to manage I/O operations in a storage system having a mirrored relationship, in accordance with an aspect of the present description.

For example, FIG. 3 illustrates examples of conditions which may provide a basis for determining whether to read the requested data from the secondary storage system rather than the primary storage system. It is appreciated that other conditions may be considered in addition to or instead of those depicted in FIG. 3. It is further appreciated that operations other than read operations, such as write operations, for example, may be directed or redirected to the secondary storage system.

In connection with one or more input/output operations such as read operations, for example, (block 300), a determination (block 310) is made as to whether the networked system is configured for read operations from the secondary storage system in accordance with the present description. If the networked system has not been suitably configured for read-from-secondary operations, the read operation will complete (block 320) from the primary storage system.

For example, in one embodiment, the hosts 14 may be configured for the ability to direct or redirect read operations to the secondary storage system instead of to the primary storage system, in accordance with the present description. In some embodiments, such read-from-secondary capability may be incorporated in the operating system software of the host 14, for example. In other embodiments, the read-from-secondary function may be incorporated in software such as an application or middle ware executing on the host 14, in firmware or in logic circuits of the host 14, or a combination thereof. It is appreciated that in other embodiments, such read-from-secondary capability may be incorporated in other components of a networked system, depending upon the particular application.

In another example of a suitable configuration, both the primary storage system and the secondary storage system of a networked system may be configured to be online, that is in communication with the host or hosts having the read-from-secondary capability. Also, in some embodiments, the primary and secondary storage systems may be initialized for swapping their respective primary and secondary roles in the event of a failure event concerning the primary storage system. One such swapping capability is offered by the IBM Hyperswap function such as the GDPS Hyperswap or the Basic Hyperswap, for example. A swapping capability is described in "SYSTEM AND METHOD FOR CONCURRENT LOGICAL DEVICE SWAPPING," U.S. Pat. No. 7,085,956. It is appreciated that a primary and secondary storage system configured for Hyperswap facilitates implementation of a read-from-secondary capability in accordance with the present description. For example, a secondary storage system configured for Hyperswap is already configured for full read and write operations from a host in the event of a failure at the primary storage system.

In yet another example of a suitable configuration, both a storage device of the primary storage system and a counterpart storage device of the secondary storage system may be configured to have the same device number but in two different subchannel sets, for example. Publications describing use of subchannel sets include "METHODS AND COMPUTER PROGRAM PRODUCTS FOR SWAPPING SYN-CHRONOUS REPLICATION SECONDARIES FROM A SUBCHANNEL SET OTHER THAN ZERO TO SUBCHANNEL SET ZERO USING DYNAMIC I/O," Ser. No. 12/013,659, issued as U.S. Pat. No. 8,307,129; "SWAPPING PPRC SECONDARIES FROM A SUBCHANNEL SET OTHER THAN ZERO TO SUBCHANNEL SET ZERO USING CONTROL BLOCK FIELD MANIPULATION," Ser. No. 12/180,651, filed Jul. 28, 2008, published as US20100023647A1; "METHODS AND COMPUTER PROGRAM PRODUCTS FOR DEFINING SYNCHRONOUS REPLICATION DEVICES IN A SUBCHANNEL SET OTHER THAN SUBCHANNEL SET ZERO," issued as U.S. Pat. No. 7,761,610; and "Method of Defining Fixed Block Architecture (FBA) Devices within Subchannel Sets other than Subchannel Set Zero," published at IP.com Prior Art Database Technical Disclosure on Dec. 23, 2009. Due to the mirroring operation, a storage device in the secondary storage system, having the same device number as the counterpart storage device in the primary storage system, will have the same data mirrored from the storage device having the same device number in the primary storage system.

In one embodiment, the device number may be a four digit logical unit number (LUN), for example. Thus, a host may issue a read operation directed to a particular device number, and the read-from-secondary management 24 can direct that read operation to the storage device having that particular device number in either the primary storage system or the secondary storage system. In one embodiment, the device numbers of the secondary storage system reside in different host subchannel sets than those of the primary storage system so the I/O operations may be directed to the intended storage system.

It is appreciated that other configurations of a networked system may be suitable for read-from-secondary operations in accordance with the present description, in addition to or instead of those configurations described herein, depending upon the particular application.

Another example of a condition which may provide a basis for determining whether to read the requested data from the secondary storage system rather than from the primary storage system, is a determination (block 330) as to whether the particular operation is eligible for read-from-secondary handling in accordance with the present description. If the operation is not eligible for read-from-secondary operations, the read operation will complete (block 320) from the primary storage system.

For example, a read operation designated as read only as set in file mask may be eligible for read-from-secondary handling in one embodiment. It is appreciated that other types of read operations may be eligible as well, depending upon the particular application. For example, a read operation may be explicitly designated by the host 14 as intended to be read from the secondary storage system rather than the primary storage system.

Another example of determining eligibility of a read operation for read-from-secondary handling in accordance with the present description may be determining whether suitable safeguards for ensuring I/O transaction integrity have been implemented. In some data mirroring systems, a transaction manager may apply one or more of the properties of Atomicity, Consistency, Isolation, and Durability, often referred to as the ACID concepts.

Atomicity applied to a transaction seeks to ensure that all of the tasks that make up a given transaction successfully complete; otherwise, the entire transaction is voided. In other words, Atomicity provides for an "all or nothing"

transaction. Unless all I/O tasks of the entire transaction are successfully completed, any portion of the I/O tasks of that transaction which did complete are all rolled back to a state which is the same as if the transaction had not been attempted.

Consistency applied to a transaction seeks to ensure that the integrity of the data is maintained at all times such that only valid data is written to the database. If any failure occurs such as a transaction violating a consistency rule, the data should be returned to the state it was in before the transaction started. However, if the transaction is valid, the database is permitted to advance to a different state but one that is still consistent with the rules. Thus, updates to the primary storage system should be successfully mirrored to the secondary storage system such that the data on both the primary and secondary storage systems should be consistent; otherwise, the update to the primary storage system should be rolled back.

Isolation applied to a transaction seeks to ensure that the transaction will not show data in its intermediate steps. One example of Isolation is serialization of transactions, frequently utilizing "locks" or storage device reservations. For example, in two-phase locking, in order to access a set of data in a database, a transaction may need to acquire a lock for this set of data. Depending upon the type of access operation type (e.g., reading from or writing to the set of data) and depending upon the lock type, acquiring the lock may be blocked and postponed, if another transaction is holding a lock for that set of data. Thus, a transaction seeking access to a set of data will have its access delayed until the transaction holding the lock and accessing that same or overlapping set of data completes. In this manner, access to intermediate data of one transaction by another transaction may be avoided.

In some embodiments, transaction serialization may also be provided by a transaction reserving a storage device to the exclusion of other transactions until the transaction completes. The transaction releases the device reservation upon successful completion of the transaction to permit other transactions to reserve and access the storage device.

Durability applied to a transaction seeks to ensure that after the transaction completes, the results will remain in the database ready for the next transaction. If, for some reason, the system fails or the database crashes, the content of the database can be regenerated correctly without loss of data. Thus, unlike data backups, where the data from the system is typically in an earlier state, Durability provides that the latest real-time state can be retrieved if necessary. The ACID concept is described in International Organization of Standardization documentation ISO/IEC 10026-1:1992 Section 4.

It is appreciated that other properties for ensuring I/O transaction integrity may be implemented, depending upon the particular application. For example, the ECKD Atomicity Rules promulgated by IBM Corporation may be applied for use in connection with read-from-secondary handling in accordance with the present description. Thus, in a read operation from a storage device of the secondary storage system, serialization of the transaction including serialization of storage device access and extent range access is coordinated with the control unit of the primary storage system such as a storage controller of the primary storage system 4a.

For example, in order to access a set of data in the secondary storage system mirrored from the primary storage system, a read transaction may need to acquire a lock for this set of data or a reservation for the storage device on which the set of data is stored. The granting and release of data set locks and storage device reservations may be controlled by the storage controller of the primary storage system, for example, to ensure serialization of the transaction. Alternatively, it is appreciated that control of the granting and releasing of the locks and reservations may be controlled by the storage controller of the secondary storage system in coordination with the storage controller of the primary storage system, for example. Other arrangements for controlling locks, reservations and serialization may be provided, depending upon the particular application.

Similarly, Read/Write operations accessing the same tracks of a storage device of the primary storage system and a storage device of the secondary storage system having the same device number, should, in one embodiment, yield consistent results while data mirroring from the primary storage system to the secondary storage system is active. Hence, a read operation may be determined to be eligible for read-from-secondary handling, if the storage controller of the primary storage system indicates that mirroring of the tracks to be accessed by the read operation has been completed and the data on those tracks of the primary and secondary storage systems is consistent.

One or more of the properties of Atomicity, Consistency, Isolation, Serialization, Durability and other properties for ensuring data integrity may be applied by the operating system of the host or by other software of the host such as application programs and middle ware. For example, a database program DB2 marketed by IBM Corporation provides for transaction serialization which serializes access to data via a coupling facility. Thus, for transactions originating from an application such as DB2, a separate check for transaction serialization may be bypassed since serialization is provided by the application itself. Other software such as VSAM RLS marketed by IBM Corporation also provides for transaction serialization. Middle ware such as QREP marketed by IBM may also be suitable for use in connection with read-from-secondary functions in accordance with the present description. It is appreciated that other software may benefit from read-from-secondary capabilities in accordance with the present description.

Other transactions may be deemed eligible for read-from-secondary handling if the read request specifies that one or more data integrity ensuring processes may be bypassed. For example, a read operation may specify to "bypass extent serialization checking." If so, and if serialization is otherwise a condition for read-from-secondary eligibility in a particular embodiment, the operation may be deemed to nonetheless be eligible for read-from-secondary handling notwithstanding that the system software or hardware does not provide for transaction serialization, for example.

In one embodiment, transactions may be deemed eligible for read-from-secondary handling if mirroring of data from the primary storage system to a secondary storage system is successfully taking place. Conversely, should the read-from-secondary management detect a suspend event in which the mirroring of data from the primary storage system to a secondary storage system is suspended, any ongoing read operations which are being redirected to the secondary storage system may be cancelled. In addition, the cancelled read operations may be restarted as read operation to read data from the primary storage system instead of from the secondary storage system. It is appreciated that these and other data integrity properties may be applied by other software, firmware, hardware, or combinations thereof in a host or in another component of the networked system, depending upon the particular application.

Another example of a condition which may provide a basis for determining whether to read the requested data from the secondary storage system rather than the primary storage system, is a determination (block 340) as to whether the particular operation is permitted by a read-from-secondary policy which may be selected by the operator of the networked system, for example. Such a policy or policies may have a variety of goals such as reducing response time for operations, improving utilization of underutilized resources, reducing contention by transactions competing for resources, etc. If the operation is not permitted by a read-from-secondary policy, the read operation will complete (block 320) from the primary storage system. Such read-from-secondary policies may be selectively switched on or off by the operator to selectively enable or disable individual read-from-secondary policies, as conditions warrant. Absent user intervention, various read-from-secondary policies may be enabled or disabled by default, depending upon the particular application.

Figure 4:
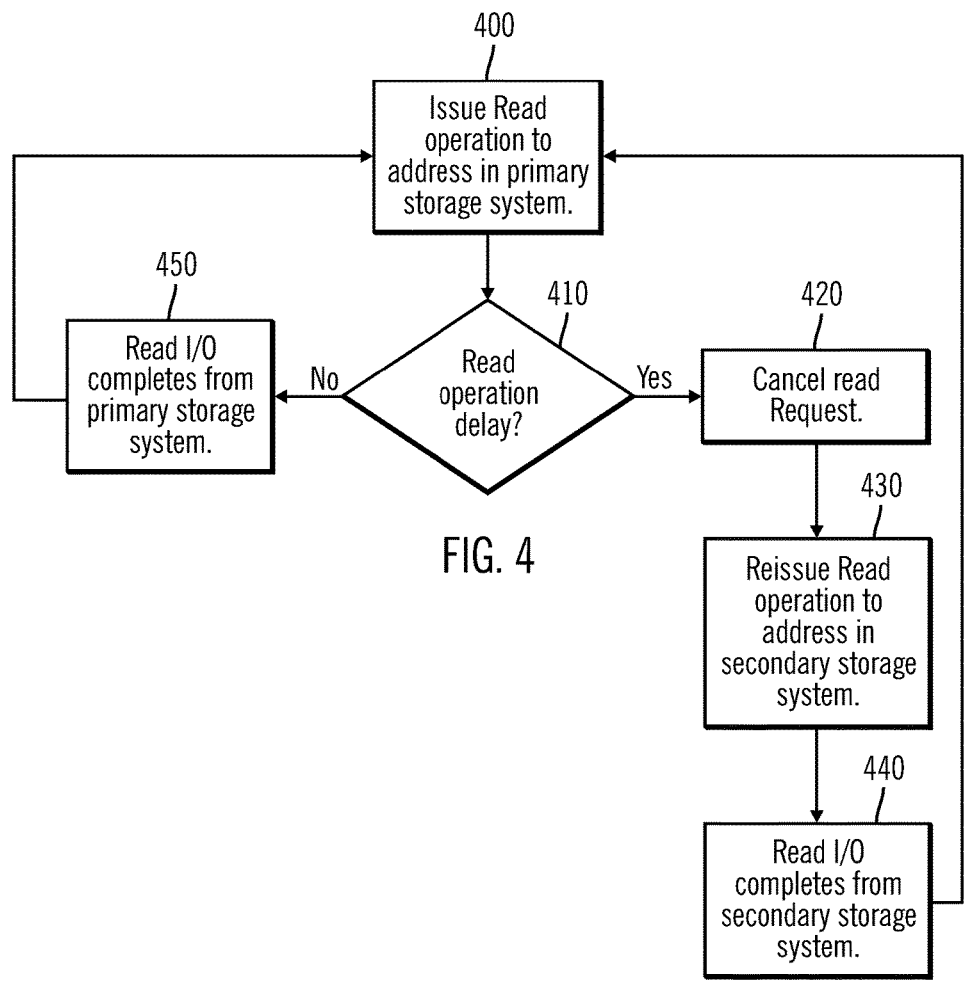
FIG. 4 illustrates yet another embodiment of operations to manage data read operations in a storage system having a mirrored relationship, in accordance with an aspect of the present description.

FIG. 4 shows one example of a policy implementation which seeks to reduce response time for operations. Although FIG. 4 depicts operations in connection with read operations, it is appreciated that operations such as those depicted in FIG. 4 may be applicable to other I/O operations such as write operations, for example. In this example, a read operation is issued (block 400) by a host wherein the read operation is directed by the host to an address in a storage device in the primary storage system. In the illustrated embodiment, an address for a read operation may include the device number or numbers of the storage device or devices on which the target data is stored, as well as an identification of the extents or tracks of that storage device or devices containing the target data.

A determination (block 410) is made as to whether an excessive delay is encountered in completing the operation. For example, a timer may be set for a predetermined time period or threshold upon issuance of the read operation. If the read operation does not complete before expiration of the time period, the original read request may be cancelled (block 420), and the read operation restarted or reissued (block 430) to read (block 440) the requested data from the same address but from a storage device or devices in the secondary storage system instead of the primary storage system as originally intended. Conversely, if the original read operation (block 400) proceeds without excessive delay (block 410), the requested data may be read (block 450) from the primary storage system as originally intended. Although a storage device of the primary storage system and the counterpart storage device of the secondary storage system may have the same device number, the particular storage device target of data read operations can be distinguished between a pair of storage devices having the same device number since the device numbers of the pair are in different host subchannel sets in the illustrated embodiment.

A delay in I/O operations at the primary storage system may be caused by a variety of factors, which are frequently temporary in nature. For example, conditions which can prolong I/O operations include various error recovery processes which the storage system may be undergoing at the time the I/O operation is initiated. The error recovery processes include, for example, failover recovery, state saves, RAID rebuilding, etc. Other conditions which may delay completion of an I/O operation include failures of one or more nodes or transmission lines of the SAN or SAN error conditions such as SAN congestion, reset event error recovery, missing interrupts, cabling errors, etc. Still other conditions which can adversely affect I/O response times are operator errors or timing problems such as an I/O request arriving at the tail of the response time distribution of spinning disk drives.

In accordance with one aspect of the present description, should a host detect that a read operation response time exceeds a predefined threshold, the host can redirect the same read operation to the mirrored address in the secondary storage system. It is believed that the likelihood is low that both the primary and the secondary storage systems would be in a condition that causes a long read operation response time. Hence, it is believed that the read-from-secondary handling of the read operation can reduce the frequency of long read operations due to various conditions which may occur in the primary storage system.

However, in the event that an excessive delay is also experienced for the read operation redirected to the secondary storage system, the read operation may be redirected back to the primary storage system. In one embodiment, an option of redirecting the read operation back to the secondary storage system after it has already been redirected to the secondary storage system, may be disabled to prevent the read operation from being "ping ponged" back and forth between the primary and secondary storage systems.

In the illustrated embodiment, the response time threshold may be defined by the user as a function of a response time requirement and also the distance from the host to the secondary storage system. In one application, the distance from the host to the secondary storage system may be sufficiently short such that the read operation response time from the host to the secondary does not exceed the required response time, if any. In such an application, the relationship among a required response time (RTreq), a response time threshold (RTth) and a response time (RTsec) from the secondary storage system may be represented as:

$$RTsec+RTth<=RTreq.$$

Hence, the response time threshold (RTth) may be selected to ensure that the sum of the response time threshold (RTth) and the response time (RTsec) from the secondary storage system, would be less than the required response time (RTreq). The response time (RTsec) from the secondary storage system may be determined from measurements of prior read operations from the secondary storage system, for example. The measurements may be averaged for read operations occurring over a suitable period of time, in some embodiments. One example of a response time threshold that may be selected is 200 milliseconds. It is appreciated that other threshold values may be selected depending upon the particular application.

In another aspect of the present description, it is appreciated that delays resulting in long read operations may be caused factors other than operational problems experienced at the primary storage system. For example, long read operations may be caused by a large geographical separation between the initiator of the read operation, and the target of the read operation at the primary storage system. In such situations, a particular host initiator may be geographically closer to the secondary storage system than that host initiator is to the primary storage system.

In accordance with another aspect of the present description, yet another read-from-secondary policy may be selected which determines whether the secondary storage system is geographically closer to the host initiating a particular read operation than is the primary storage system. If so, such a geographic-based read-from-secondary policy may permit the read operation to be redirected to the secondary storage system to avoid excessively long distance read operations. In one embodiment, such redirection of read operations may be implemented without waiting for a response time threshold to be reached. Thus, the geographic-based read-from-secondary policy may be applied to read operations to redirect the read operations when it is recognized that the secondary storage system is at a shorter distance than that of the primary storage system. For example, one mechanism which may be used to measure distance is called the "Initial Command Response Time". This is an in-band FICON (Fibre Connection, an IBM proprietary name for the ANSI FC-SB-3 Single-Byte Command Code Sets-3 Mapping Protocol for Fibre Channel (FC) protocol) measurement that measures the minimal round trip delay through the storage area network (SAN) for a control unit in a channel to send a command and get an acknowledge (ACK) back from a control unit of the storage system without any execution time for the command. Thus, in one embodiment, the operating system may keep track of the minimum command response (CMR) time for each storage system or subsystem to provide an approximation of the distance between the control unit issuing the command which is relayed by the SAN, and acknowledged by a control unit of the storage system back through the SAN to the originating control unit.

Figure 5:
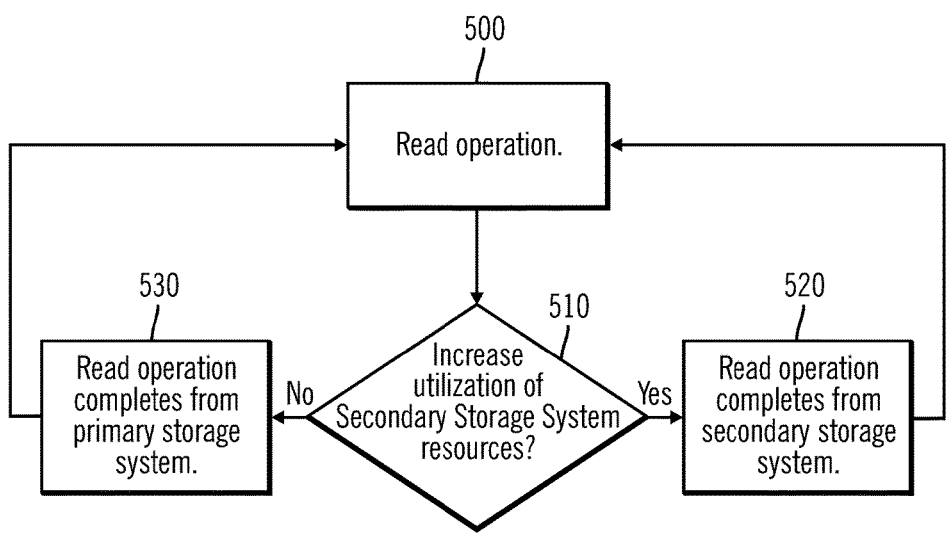
FIG. 5 illustrates still another embodiment of operations to manage data read operations in a storage system having a mirrored relationship, in accordance with an aspect of the present description.

FIG. 5 shows yet another example of a read-from-secondary policy implementation. This policy seeks to improve the balance of resource utilization of the secondary storage system as compared to that of the primary storage system. Although FIG. 5 describes operations in connection with read operations, it is appreciated that features described in connection with FIG. 5 are applicable to other operations such as write operations, for example. In this example, one or more read operations are issued (block 500) by a host. A determination (block 510) is made as to whether the utilization of one or more resources of the secondary storage system should be increased as compared to that of the primary storage system.

In accordance with the present description, it is appreciated that the resources of a secondary storage system may be underutilized, particularly as compared to the utilization of the primary storage system. By increasing (block 510) the utilization of one or more resources of the secondary storage system as compared to that of the primary storage system, such an imbalance may be at least partially corrected. Accordingly, if a load-balancing read-from-secondary policy has been implemented (block 510), read operations may be redirected to the secondary storage system instead of the primary storage system, such that one or more read operations will complete (block 520) from the secondary storage system rather than from the primary storage system. In this manner, the load-balancing read-from-secondary policy can increase utilization of resources of the secondary storage system. Conversely, if a load-balancing read-from-secondary policy has not been implemented (block 510), read operations may be directed to the primary storage system independently of the respective loads on the primary and secondary storage systems. If so the read operations will complete (block 530) from the primary storage system rather than the secondary storage system. In one embodiment, such redirection of read operations may be implemented without waiting for a response time threshold to be reached.

Accordingly, by implementing a load-balancing read-from-secondary policy as represented by block 510, it is believed that owners and operators of a data center can improve the economics of the data center by leveraging the existence of a second storage subsystem that contains an exact mirror copy of the production data residing on the primary storage system. Thus, by redirecting read operations to the secondary storage system, it is believed that workloads can benefit by improved I/O performance by lowering contention by transactions competing over resources and generally spreading the work across more physical resources as represented by the combined resources (such as caches, host bus adapters (HBAs), device adapters, switches, channels, storage devices etc.) of both the primary and secondary storage systems instead of restricting the workload primarily to the resources of the primary storage system alone.

It is appreciated that other types of read-from-secondary policies may be implemented other than those described herein, depending upon the particular application. It is further appreciated that each read-from-secondary policy may be selectively switched on (enabled) or switched off (disabled) depending upon conditions. In other embodiments, one or more particular read-from-secondary policies may be permanently implemented by the read operation management. Moreover, in some embodiments, each read-from-secondary policy may be selectively switched on (enabled) or switched off (disabled) in combination with one or more other read-from-secondary policies, depending upon the particular application. Thus, read operation management may utilize, for example, a timer-based read-from secondary policy, a load-balancing read-from secondary policy, and a geographic-based read-from-secondary policy in combination with each other, such that read operations may be directed to the secondary storage system if any of the implemented read-from-secondary policies apply to that read operation.

In one embodiment, read-from-secondary operations as described herein may be applied to a secondary storage system which is geographically remote from the primary storage system. However, it is appreciated that read-from-secondary operations in accordance with the present description may also be used in connection with local secondary storage systems which may be located at the same site as the primary storage system. Thus, for example, cache reads which would otherwise be directed to the cache of a local primary storage system, may benefit from being redirected to the cache of a secondary storage system which is local to the primary storage system.

Figure 6:
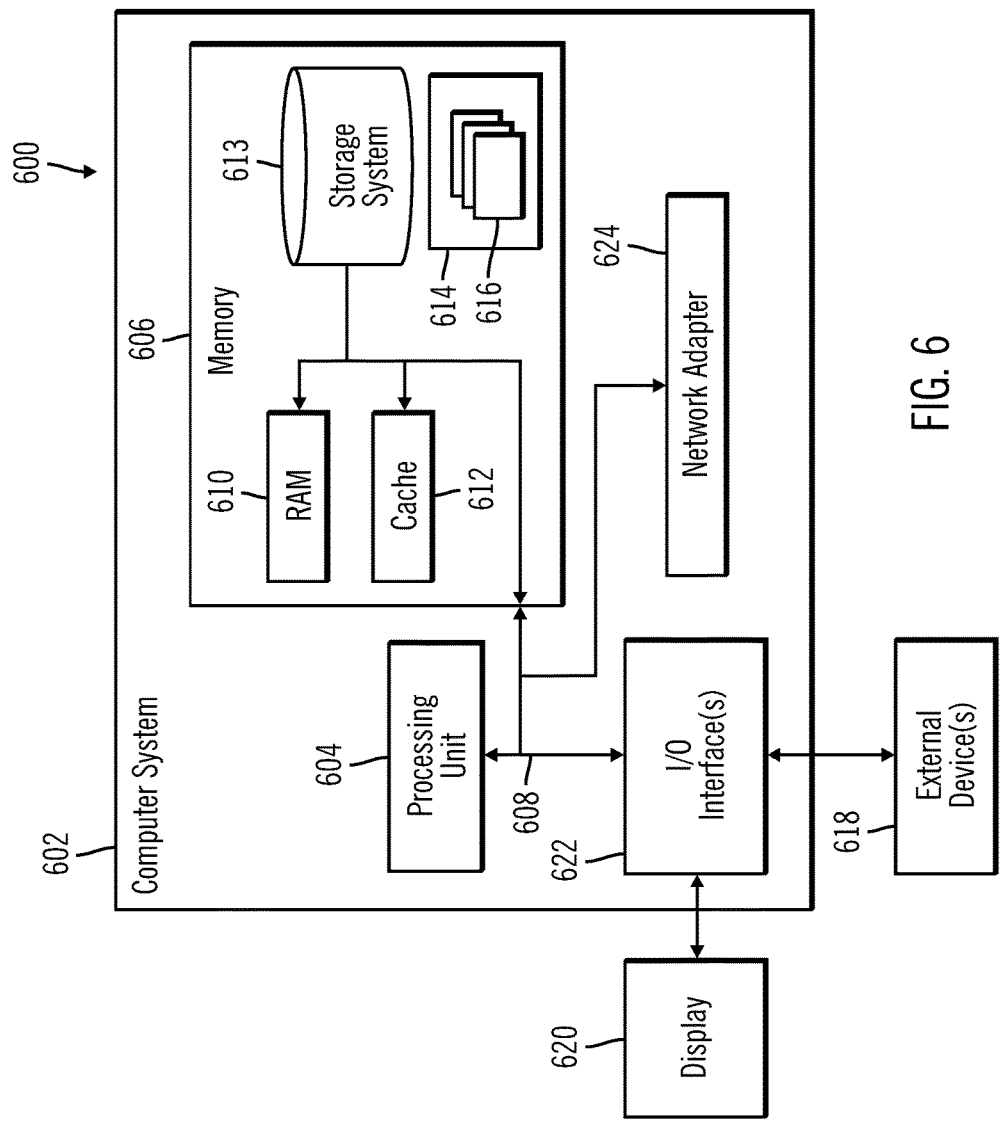
FIG. 6 illustrates an example of a computing environment in which embodiments may be implemented.

FIG. 6 illustrates an embodiment of a computer node 602 of a computer system which may comprise an implementation of read operation management systems of the present description. Computer node 602 is only one example of a suitable computing node and is not intended to suggest any limitation as to the scope of use or functionality of embodiments of the invention described herein. Regardless, computer node 602 is capable of being implemented and/or performing any of the functionality set forth hereinabove.

The computer node 602 is operational with numerous other general purpose or special purpose computing system environments or configurations. Examples of well-known computing systems, environments, and/or configurations that may be suitable for use with computer node 602 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 602 may be described in the general context of computer system executable instructions, such as program modules, being executed by a computer system.

Generally, program modules may include routines, programs, objects, components, logic, data structures, and so on that perform particular tasks or implement particular abstract data types. Computer node 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 602 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 602 typically includes a variety of computer system readable media. Such media may be any available media that is accessible by computer node 602, and it includes both volatile and non-volatile media, removable and non-removable media, and may be used for storing the programs and data used by the programs.

System memory 606 can include computer system readable media in the form of volatile memory, such as random access memory (RAM) 610 and/or cache memory 612. Computer node 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein, such as the operations of the read operation management.

Computer node 602 may also communicate with one or more external devices 618 such as a keyboard, a pointing device, a display 620, etc.; one or more devices that enable a user to interact with the computer node 602; and/or any devices (e.g., network card, modem, etc.) that enable computer system/server 602 to communicate with one or more other computing devices. Such communication can occur via Input/Output (I/O) interfaces 622. Still yet, computer node 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the invention to the precise form disclosed. Many modifications and variations are possible in light of the above teaching. It is intended that the scope be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   mirroring data stored at a primary storage system, from the primary storage system to a secondary storage system with respect to the primary storage system;
   selecting whether to direct an input/output operation to one of the primary storage system and the secondary storage system as a function of at least one of input/output operation response time and a comparison of utilization of resources of the primary storage system and the secondary storage system; and
   directing said input/output operation to the selected one of the primary storage system and the secondary storage system;

wherein selecting includes a host:
initiating a first read operation directed to the primary storage system to read mirrored read data from the primary storage system,
initiating timing of a predetermined time period at the host to provide a host-timed predetermined time period,
determining whether the host-timed predetermined time period has expired prior to completion of the first read operation, and
in response to expiration of the host-timed predetermined time period prior to completion of the first read operation, canceling the first read operation to the primary storage system and restarting the first read operation to read the mirrored read data from the secondary storage system instead of from the primary storage system while the primary storage system remains the primary storage system with respect to the secondary storage system.

2. The method of claim 1 wherein the selecting includes selecting to direct a read operation to the secondary storage system instead of to the primary storage system to increase utilization of resources of the secondary storage system relative to utilization of resources of the primary storage system.

3. The method of claim 1 wherein the selecting as a function of input/output operation response time includes measuring command response time of commands issued to the primary and secondary storage systems to provide an indication of the distances to the primary storage system and the secondary storage system, respectively, and determining as a function of the measured command response times whether the secondary storage system is at a shorter distance to the initiator of a first read operation and selecting to direct the first read operation to the secondary storage system instead of to the primary storage system if the secondary storage system is determined to be geographically closer than the primary storage system, to the initiator of the first read operation.

4. The method of claim 1 further comprising initiating a recovery process in the primary storage system in response to a failure in the primary storage system which increases read operation response time, and wherein the selecting as a function of read operation response time includes selecting to direct a read operation to the secondary storage system instead of to the primary storage system in response to initiation of the recovery process.

5. The method of claim 1 wherein the selecting includes selecting to direct a read operation to the secondary storage system instead of to the primary storage system to decrease contention over utilization of resources of the primary storage system.

6. The method of claim 1 wherein the selecting includes selecting to direct a read operation to the secondary storage system instead of to the primary storage system to increase utilization of a cache of the secondary storage system relative to utilization of a cache of the primary storage system.

7. The method of claim 1 further comprising:
detecting a suspend event in which mirroring of data from the primary storage system to a secondary storage system is suspended;
canceling a first read operation to the secondary storage system; and
restarting the first read operation to read data from the primary storage system instead of from the secondary storage system.

8. The method of claim 1 wherein a storage device in the primary storage system has a first device number in a first host subchannel set and a storage device in the secondary storage system has the same first device number in second, separate host subchannel set, and wherein the directing said input/output operation to the selected one of the primary storage system and the secondary storage system includes directing a read operation to a storage device having the first device number in a selected subchannel set of the selected one of the primary storage system and the secondary storage system.

9. A computer program product for managing input/output operations in connection with copying of data between a primary storage system having resources, and a secondary storage system with respect to the primary storage system and having resources, the computer program product comprising a non-transitory computer readable storage medium having computer readable program code embodied therein that when executed by a processor is enabled to cause operations to be performed, the operations comprising:
mirroring data stored at the primary storage system, from the primary storage system to the secondary storage system from the primary storage system;
selecting whether to direct an input/output operation to one of the primary storage system and the secondary storage system as a function of at least one of input/output operation response time and a comparison of utilization of the resources of the primary storage system and the secondary storage system; and
directing said input/output operation to the selected one of the primary storage system and the secondary storage system;
wherein the selecting includes a host:
initiating a first read operation directed to the primary storage system to read mirrored read data from the primary storage system,
initiating timing of a predetermined time period at the host to provide a host-timed predetermined time period,
determining whether the host-timed predetermined time period has expired prior to completion of the first read operation, and
in response to expiration of the host-timed predetermined time period prior to completion of the first read operation, canceling the first read operation to the primary storage system and restarting the first read operation to read the mirrored read data from the secondary storage system instead of from the primary storage system while the primary storage system remains the primary storage system with respect to the secondary storage system.

10. The product of claim 9 wherein the selecting includes selecting to direct a read operation to the secondary storage system instead of to the primary storage system to increase utilization of resources of the secondary storage system relative to utilization of resources of the primary storage system.

11. The product of claim 9 wherein the selecting as a function of input/output operation response time includes measuring command response time of commands issued to the primary and secondary storage systems to provide an indication of the distances to the primary storage system and the secondary storage system, respectively, and determining as a function of the measured command response times whether the secondary storage system is at a shorter distance to the initiator of a first read operation and selecting to direct the first read operation to the secondary storage system instead of to the primary storage system if the secondary storage system is determined to be geographically closer than the primary storage system, to the initiator of the first read operation.

12. The product of claim 9 wherein the operations further comprise initiating a recovery process in the primary storage system in response to a failure in the primary storage system which increases read operation response time, and wherein the selecting as a function of read operation response time includes selecting to direct a read operation to the secondary storage system instead of to the primary storage system in response to initiation of the recovery process.

13. The product of claim 9 wherein the selecting includes selecting to direct a read operation to the secondary storage system instead of to the primary storage system to decrease contention over utilization of resources of the primary storage system.

14. The product of claim 9 wherein the primary storage system and the secondary storage system each have a cache and wherein the selecting includes selecting to direct a read operation to the secondary storage system instead of to the primary storage system to increase utilization of the cache of the secondary storage system relative to utilization of the cache of the primary storage system.

15. The product of claim 9 wherein the operations further comprise:
   detecting a suspend event in which mirroring of data from the primary storage system to a secondary storage system is suspended;
   canceling a first read operation to the secondary storage system; and
   restarting the first read operation to read data from the primary storage system instead of from the secondary storage system.

16. The product of claim 9 wherein the primary storage system and the secondary storage system each have a storage and device and wherein the storage device in the primary storage system has a first device number in a first host subchannel set and the storage device in the secondary storage system has the same first device number in second, separate host subchannel set, and wherein the directing said input/output operation to the selected one of the primary storage system and the secondary storage system includes directing a read operation to a storage device having the first device number in a selected subchannel set of the selected one of the primary storage system and the secondary storage system.

17. A system, comprising:
   a host;
   a primary storage system having resources;
   a secondary storage system having resources; and
   at least one non-transitory computer readable storage medium having computer readable program code embodied therein that when executed by a processor is enabled to cause operations to be performed, the operations comprising:
   mirroring data stored at the primary storage system, from the primary storage system to the secondary storage system from the primary storage system;
   selecting whether to direct an input/output operation to one of the primary storage system and the secondary storage system as a function of at least one of input/output operation response time and a comparison of utilization of the resources of the primary storage system and the secondary storage system; and
   directing said input/output operation to the selected one of the primary storage system and the secondary storage system;
   wherein the selecting includes the host:
      initiating a first read operation directed to the primary storage system to read mirrored read data from the primary storage system,
      initiating timing of a predetermined time period at the host to provide a host-timed predetermined time period,
      determining whether the host-timed predetermined time period has expired prior to completion of the first read operation, and
      in response to expiration of the host-timed predetermined time period prior to completion of the first read operation, canceling the first read operation to the primary storage system and restarting the first read operation to read the mirrored read data from the secondary storage system instead of from the primary storage system while the primary storage system remains the primary storage system with respect to the secondary storage system.

18. The system of claim 17 wherein the selecting includes selecting to direct a read operation to the secondary storage system instead of to the primary storage system to increase utilization of resources of the secondary storage system relative to utilization of resources of the primary storage system.

19. The system of claim 17 wherein the selecting as a function of input/output operation response time includes measuring command response time of commands issued to the primary and secondary storage systems to provide an indication of the distances to the primary storage system and the secondary storage system, respectively, and determining as a function of the measured command response times whether the secondary storage system is at a shorter distance to the initiator of a first read operation and selecting to direct the first read operation to the secondary storage system instead of to the primary storage system if the secondary storage system is determined to be geographically closer than the primary storage system, to the initiator of the first read operation.

20. The system of claim 17 wherein the operations further comprise initiating a recovery process in the primary storage system in response to a failure in the primary storage system which increases read operation response time, and wherein the selecting as a function of read operation response time includes selecting to direct a read operation to the secondary storage system instead of to the primary storage system in response to initiation of the recovery process.

21. The system of claim 17 wherein the selecting includes selecting to direct a read operation to the secondary storage system instead of to the primary storage system to decrease contention over utilization of resources of the primary storage system.

22. The system of claim 17 wherein the primary storage system and the secondary storage system each have a cache and wherein the selecting includes selecting to direct a read operation to the secondary storage system instead of to the primary storage system to increase utilization of the cache of the secondary storage system relative to utilization of the cache of the primary storage system.

23. The system of claim 17 wherein the operations further comprise:
   detecting a suspend event in which mirroring of data from the primary storage system to a secondary storage system is suspended;

canceling a first read operation to the secondary storage system; and restarting the first read operation to read data from the primary storage system instead of from the secondary storage system.

24. The system of claim 17 wherein the primary storage system and the secondary storage system each have a storage and device and wherein the storage device in the primary storage system has a first device number in a first host subchannel set and the storage device in the secondary storage system has the same first device number in second, separate host subchannel set, and wherein the directing said input/output operation to the selected one of the primary storage system and the secondary storage system includes directing a read operation to a storage device having the first device number in a selected subchannel set of the selected one of the primary storage system and the secondary storage system.

\* \* \* \* \*